US011175672B2

(12) United States Patent
Itozawa (10) Patent No.: US 11,175,672 B2
(45) Date of Patent: Nov. 16, 2021

(54) AUTONOMOUS MOVING SYSTEM, AUTONOMOUS MOVING BODY, CHARGING DOCK, CONTROL METHOD, AND PROGRAM

(71) Applicant: TOYOTA JIDOSHA KABUSHIKI KAISHA, Toyota-shi (JP)

(72) Inventor: Yuta Itozawa, Aichi-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 113 days.

(21) Appl. No.: 16/378,679

(22) Filed: Apr. 9, 2019

(65) Prior Publication Data

US 2019/0346852 A1  Nov. 14, 2019

(30) Foreign Application Priority Data

May 11, 2018  (JP) .............................. JP2018-092141

(51) Int. Cl.
*G05D 1/02* (2020.01)
*B25J 9/16* (2006.01)
(Continued)

(52) U.S. Cl.
CPC ............ *G05D 1/0221* (2013.01); *B25J 9/163* (2013.01); *B25J 9/1697* (2013.01);
(Continued)

(58) Field of Classification Search
CPC ... B25J 19/005; B25J 5/00; B25J 9/163; B25J 9/1697; B60L 2200/40; B60L 2260/32;
(Continued)

(56) References Cited

U.S. PATENT DOCUMENTS 4,679,152 A * 7/1987 Perdue .................. B25J 19/005
                                                180/167
8,977,393 B1 * 3/2015 Kohler ...................... H02J 7/02
                                                700/248
(Continued)

FOREIGN PATENT DOCUMENTS

| CN | 207051978 U | 2/2018 |
| JP | 4418381 B2 | 2/2010 |
| JP | 5070441 B2 | 11/2012 |
| JP | 2017-174359 A | 9/2017 |
| JP | 2017-185578 A | 10/2017 |

*Primary Examiner* — Behrang Badii
*Assistant Examiner* — Daniell Greene
(74) *Attorney, Agent, or Firm* — Oliff PLC (57) ABSTRACT

An autonomous moving body includes: a driven body including a carriage capable of moving autonomously; a battery; a first communication unit capable of communicating with a charging dock; and a first arithmetic processing unit for executing first arithmetic processing related to the drive of the driven body among arithmetic processings of the autonomous moving body. A charging dock includes: a charger for charging the battery; a second communication unit capable of communicating with the autonomous moving body; and a second arithmetic processing unit for executing second arithmetic processing other than the first arithmetic processing among the arithmetic processings of the autonomous moving body. The second communication unit is configured to be able to receive arithmetic data used for the second arithmetic processing from the first communication unit, and to transmit a processing result of the second arithmetic processing executed by the second arithmetic processing unit to the first communication unit.

8 Claims, 3 Drawing Sheets

1

(51) Int. Cl.
    *G05B 19/4155* (2006.01)
    *G05D 1/00* (2006.01)
    *B60L 53/00* (2019.01)

(52) U.S. Cl.
    CPC ....... *G05B 19/4155* (2013.01); *G05D 1/0088* (2013.01); *G05D 1/0225* (2013.01); *B60L 53/00* (2019.02); *G05B 2219/40153* (2013.01)

(58) Field of Classification Search
    CPC .......... B60L 53/00; B60L 53/14; B60L 53/31; B60L 53/66; G05B 19/4155; G05B 2219/40153; G05B 1/0088; G05B 1/0221; G05B 1/0225; Y02T 10/70; Y02T 10/7072; Y02T 90/12; Y02T 90/14; Y02T 90/16; H02J 7/00036; H02J 7/00047; H02J 7/0027
    See application file for complete search history.

(56) References Cited

U.S. PATENT DOCUMENTS

| | | | | |
|---|---|---|---|---|
| 9,717,387 | B1* | 8/2017 | Szatmary | A47L 9/009 |
| 9,827,677 | B1* | 11/2017 | Gilbertson | B25J 15/0014 |
| 9,827,678 | B1* | 11/2017 | Gilbertson | B25J 18/025 |
| 10,089,586 | B2* | 10/2018 | Vestal | G06Q 10/063114 |
| 2014/0277718 | A1* | 9/2014 | Izhikevich | B25J 9/161 |
| | | | | 700/250 |
| 2014/0371907 | A1* | 12/2014 | Passot | G06N 3/008 |
| | | | | 700/257 |
| 2015/0202974 | A1 | 7/2015 | Rub et al. | |
| 2015/0321570 | A1 | 11/2015 | Cun | |
| 2016/0250752 | A1* | 9/2016 | Djugash | B25J 9/161 |
| | | | | 700/264 |
| 2017/0066128 | A1* | 3/2017 | Gildert | B25J 9/1679 |
| 2019/0291277 | A1* | 9/2019 | Oleynik | B25J 9/163 |

\* cited by examiner

AUTONOMOUS MOVING SYSTEM, AUTONOMOUS MOVING BODY, CHARGING DOCK, CONTROL METHOD, AND PROGRAM

CROSS REFERENCE TO RELATED APPLICATIONS

This application is based upon and claims the benefit of priority from Japanese patent application No. 2018-092141, filed on May 11, 2018, the disclosure of which is incorporated herein in its entirety by reference.

BACKGROUND

The present disclosure relates to an autonomous moving system, an autonomous moving body, a charging dock, a control method, and a program.

An autonomous moving body such as an autonomous moving robot that includes a battery and moves autonomously has been known. For example, an autonomous moving robot disclosed in Japanese Patent No. 4418381 charges a battery at a charging station (a charging dock).

An autonomous moving body consumes a battery by moving autonomously and executing various arithmetic processings. Therefore, the autonomous moving body needs to charge the battery in the charging dock every time it consumes the battery. However, the higher the frequency with which the autonomous moving body returns to the charging dock, the lower an operation efficiency of the autonomous moving body becomes.

On the other hand, Japanese Patent No. 5070441 discloses a technique in which when it becomes difficult for a robot (an autonomous moving body) to perform autonomous control, an operation terminal remote-controls the robot through wireless communication. When the period for remote-controlling the autonomous moving robot is set as described in Japanese Patent No. 5070441, processing load of an arithmetic processing unit provided in the autonomous moving body can be reduced, which suppresses a consumption of the battery which the autonomous moving body includes. As a result, it may be possible to prevent the operation efficiency of the autonomous moving body from being reduced. However, when the autonomous moving body is moved by remote control through wireless communication, a real-time moving operation of the autonomous moving body may become awkward depending on a communication amount or a communication speed.

SUMMARY

As described above, in related art regarding an autonomous moving body, there has been a demand for preventing a problem in which a moving operation of an autonomous moving body becomes awkward from occurring while an operation efficiency of an autonomous moving body is prevented from being reduced.

The present disclosure has been made in view of the above-described problem, and provides an autonomous moving system, an autonomous moving body, a charging dock, a control method, and a program capable of preventing a problem in which a moving operation of an autonomous moving body becomes awkward from occurring while an operation efficiency of an autonomous moving body is prevented from being reduced.

A first exemplary aspect is an autonomous moving system, including an autonomous moving body and a charging dock, the autonomous moving body including: a driven body that includes at least a carriage capable of moving autonomously; and a battery, the charging dock including a charger configured to charge the battery, the autonomous moving body further including: a first communication unit configured to be able to communicate with the charging dock; and a first arithmetic processing unit configured to execute first arithmetic processing related to the drive of the driven body among arithmetic processings of the autonomous moving body, the charging dock further including: a second communication unit configured to be able to communicate with the autonomous moving body; and a second arithmetic processing unit configured to execute second arithmetic processing other than the first arithmetic processing among the arithmetic processings of the autonomous moving body, in which the second communication unit is configured to be able to receive arithmetic data used for the second arithmetic processing from the first communication unit, and is configured to be able to transmit a processing result of the second arithmetic processing which has been executed by the second arithmetic processing unit to the first communication unit.

Another exemplary aspect is an autonomous moving body including:

a driven body including at least a carriage capable of moving autonomously; and a battery capable of charging at a charging dock, the autonomous moving body further including:

a communication unit capable of communicating with the charging dock; and an arithmetic processing unit configured to execute first arithmetic processing related to the drive of the driven body among arithmetic processings of the autonomous moving body, in which the communication unit is configured to be able to transmit arithmetic data used for second arithmetic processing other than the first arithmetic processing among the arithmetic processings of the autonomous moving body to the charging dock, and is configured to be able to receive a processing result of the second arithmetic processing which has been executed by the charging dock from the charging dock.

Another exemplary aspect is a charging dock including a charger configured to charge a battery of an autonomous moving body, the autonomous moving body including: a driven body that includes at least a carriage capable of moving autonomously; and the battery, the charging dock further including:

a communication unit capable of communicating with the autonomous moving body; and an arithmetic processing unit configured to execute second arithmetic processing other than first arithmetic processing related to the drive of the driven body among arithmetic processings of the autonomous moving body, in which the communication unit is configured to be able to receive arithmetic data used for the second arithmetic processing from the autonomous moving body, and is configured to be able to transmit a processing result of the second arithmetic processing which has been executed by the arithmetic processing unit to the autonomous moving body.

Another exemplary aspect is a method for controlling an autonomous moving body, the autonomous moving body including: a driven body that includes at least a carriage capable of moving autonomously; and a battery capable of being charged at a charging dock, the method including:

configuring the autonomous moving body so as to be capable of executing first arithmetic processing related to the drive of the driven body among arithmetic processings of the autonomous moving body;

configuring the autonomous moving body so as to be capable of transmitting arithmetic data used for second arithmetic processing other than the first arithmetic processing among the arithmetic processings of the autonomous moving body to the charging dock; and configuring the autonomous moving body so as to be capable of receiving a processing result of the second arithmetic processing which has been executed by the charging dock from the charging dock.

Another exemplary aspect is a method for controlling a charging dock, the charging dock including a charger configured to charge a battery of an autonomous moving body, the autonomous moving body including: a driven body that includes at least a carriage capable of moving autonomously; and the battery, the method including:

configuring the charging dock so as to be capable of receiving arithmetic data used for second arithmetic processing other than first arithmetic processing related to the drive of the driven body among arithmetic processings of the autonomous moving body from the autonomous moving body;

configuring the charging dock so as to be capable of executing the second arithmetic processing; and configuring the charging dock so as to be capable of transmitting a processing result of the second arithmetic processing to the autonomous moving body.

Another exemplary aspect is a program causing an autonomous moving body to function as a communication means capable of communicating with the charging dock, and an arithmetic processing means for executing first arithmetic processing related to the drive of a driven body among arithmetic processings of the autonomous moving body, the autonomous moving body including: the driven body that includes at least a carriage capable of moving autonomously; and a battery capable of charging at a charging dock, in which the communication means is configured to be able to transmit arithmetic data used for second arithmetic processing other than the first arithmetic processing among the arithmetic processings of the autonomous moving body, and is configured to be able to receive a processing result of the second arithmetic processing which has been executed by the charging dock from the charging dock.

Another exemplary aspect is a program causing a charging dock to function as a communication means capable of communicating with an autonomous moving body and an arithmetic processing means for executing second arithmetic processing other than first arithmetic processing related to the drive of a driven body among arithmetic processings of the autonomous moving body, the charging dock including a charger configured to charge a battery of the autonomous moving body, the autonomous moving body including: the driven body that includes at least a carriage capable of moving autonomously; and the battery, in which the communication means is configured to be able to receive arithmetic data used for the second arithmetic processing from the autonomous moving body, and is configured to be able to transmit a processing result of the second arithmetic processing which has been executed by the arithmetic processing means to the autonomous moving body.

According to the present disclosure, it is possible to provide an autonomous moving system, an autonomous moving body, a charging dock, a control method, and a program capable of preventing a problem in which a moving operation of an autonomous moving body becomes awkward from occurring while an operation efficiency of an autonomous moving body is prevented from being reduced.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Embodiments according to the present disclosure are described hereinafter with reference to the drawings. Note that for clarifying the explanation, the following descriptions and the drawings are simplified as appropriate. Further, the same symbols are assigned to the same components throughout the drawings and duplicated explanations are omitted as required. Furthermore, the following embodiments are described as that an autonomous moving body is an autonomous moving robot.

Figure 1:
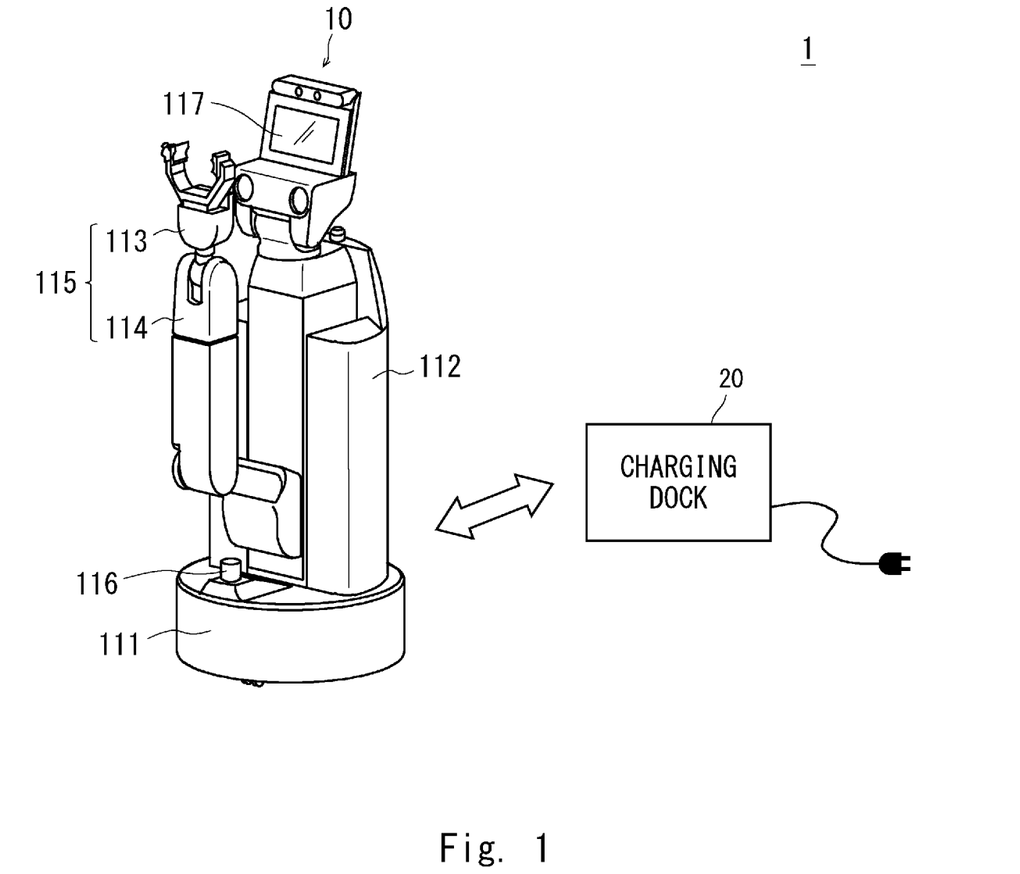
FIG. 1 shows an example of a schematic configuration of an autonomous moving system according to an embodiment.

First, a schematic configuration of an autonomous moving system 1 according to this embodiment is described with reference to FIG. 1. FIG. 1 shows an example of the schematic configuration of the autonomous moving system 1 according to this embodiment.

As shown in FIG. 1, the autonomous moving system 1 according to this embodiment includes an autonomous moving robot 10 and a charging dock 20. Further, the autonomous moving robot 10 includes a carriage 111, a body 112, an arm 115, and a first sensor 116, and a second sensor 117. The carriage 111 and the arm 115 are examples of driven bodies.

The carriage 111 is configured to be able to rotate around a rotation axis. Further, wheels are provided in the carriage 111, and an arithmetic processing unit 130 which will be described later controls a rotation of these wheels so that the autonomous moving robot 10 (the carriage 111) moves autonomously.

The body 112 is attached to the carriage 111. The arm 115 is provided in the body 112. The arm 115 includes a grasping unit 113 and an arm unit 114. The grasping unit 113 functions as a hand that grasps an object. The grasping unit 113 is provided in a tip of the arms 115 (a side opposite to the body 112) and is supported by the arm unit 114.

The first sensor 116 is attached to the carriage 111 and detects an obstacle in a moving environment in which the autonomous moving robot 10 can move. The first sensor 116 is a sensor capable of simultaneously detecting distances to a plurality of points, or a sensor capable of simultaneously detecting a distance to a plane and an angle formed by the plane and direction of the sensor, and is for example, a laser range sensor.

The second sensor 117 is a three-dimensional sensor, such as a stereo camera and a three-dimensional camera, and is provided in the upper part of the body 112. For example, the second sensor 117 photographs an object to be grasped by the autonomous moving robot 10 (the grasping unit 113 of the arm 115).

Note that the autonomous moving robot 10 may be include a sensor other than the first and the second sensors 116 and 117 (for example, a microphone and a gyro sensor) to recognize a state in the moving environment.

An autonomous moving operation of the autonomous moving robot 10 are controlled by the arithmetic processing unit 130 which will be described later. The arithmetic processing unit 130 acquires information on a distance to an obstacle in the moving environment by the first sensor 116, generates a moving path based on the acquired distance information, and makes the autonomous moving robot 10 (the carriage 111) move autonomously along the generated moving path.

The autonomous moving robot 10 incorporates a battery 160 which will be described later, and is driven by the battery 160. When the autonomous moving robot 10 determines that it is necessary to charge the battery 160 since the remaining capacity thereof is lowered, it returns to a charging dock 20 by moving autonomously.

The charging dock 20 is installed in the moving environment in which the autonomous moving robot 10 can move, and includes a charger 230 which will be described later. When the autonomous moving robot 10 returns to the charging dock 20, the charger 230 supplies electricity supplied from a commercial power source through an outlet to the battery 160 of the autonomous moving body 10 to charge the same.

Figure 2:
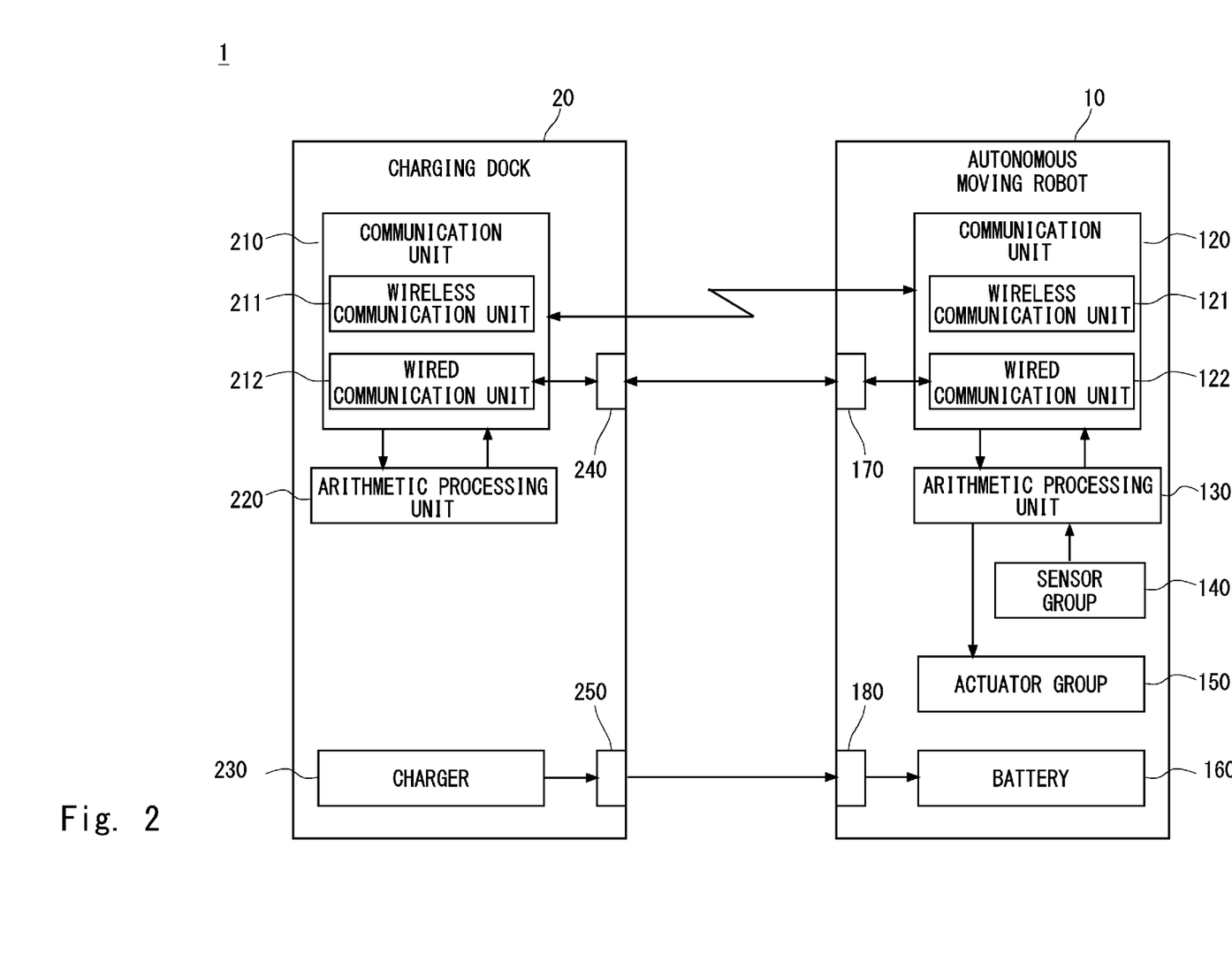
FIG. 2 is a block diagram showing a schematic functional block configuration of the autonomous moving system according to the embodiment.

Next, a schematic functional block configuration of the autonomous moving system 1 according to this embodiment is described with reference to FIG. 2. FIG. 2 is a block diagram showing a schematic functional block configuration of the autonomous moving system 1 according to the embodiment.

As shown in FIG. 2, the autonomous moving robot 10 includes a communication unit 120, an arithmetic processing unit 130, a sensor group 140, an actuator group 150, the battery 160, a communication terminal 170, and a charging terminal 180. The communication unit 120 is an example of the first communication unit, and the arithmetic processing unit 130 is an example of the first arithmetic processing unit.

Further, the charging dock 20 includes a communication unit 210, an arithmetic processing unit 220, the charger 230, a communication terminal 240, and a charging terminal 250. The communication unit 210 is an example of the second communication unit, and the arithmetic processing unit 220 is an example of the second arithmetic processing unit.

Note that in the autonomous moving robot 10, for example, the battery 160 is incorporated into the carriage 111 shown in FIG. 1. The communication terminal 170 and the charging terminal 180 may be disposed at any position in the carriage 111 shown in FIG. 1, such as the front surface, the rear surface, the side surfaces, or the bottom surface thereof. Further, the communication unit 120 and the arithmetic processing unit 130 may be incorporated into either the carriage 111 or the body 112 shown in FIG. 1. Further, in the charging dock 20, the communication terminal 240 and the charging terminal 250 may be disposed at positions corresponding to the communication terminal 170 and the charging terminal 180 of the autonomous moving robot 10.

The charger 230 supplies electricity to the battery 160 to charge the same. The battery 160 supplies electricity charged by the charger 230 to components in the autonomous moving robot 10. In the charging dock 20, the charger 230 is connected to the charging terminal 250, and in the autonomous moving robot 10, the battery 160 is connected to the charging terminal 180. When the battery 160 of the autonomous moving robot 10 is charged, the autonomous moving robot 10 moves autonomously so that the charging terminal 180 of the autonomous moving robot 10 is connected to the charging terminal 250 of the charging dock 20. When the charging terminal 180 is connected to the charging terminal 250, charging the battery is started.

In this embodiment, when the charging terminal 180 of the autonomous moving robot 10 is connected to the charging terminal 250 of the charging dock 20, the communication terminal 170 of the autonomous moving robot 10 is also connected to the communication terminal 240 of the charging dock 20. Accordingly, when the battery 160 of the autonomous moving robot 10 is charged, a wired communication unit 122 of the charging dock 20 and a wired communication unit 212 of the autonomous moving robot 10 are electrically connected to each other so that wired communication can be performed.

The communication unit 120 includes a wireless communication unit 121 and the wired communication unit 122, and the communication unit 210 includes a wireless communication unit 211 and the wired communication unit 212.

The wireless communication units 121 and 211 can communicate with each other through wireless communication. Although the wireless communication system can be wireless LAN (Local Area Network) communication, Bluetooth (registered trademark) communication, or the like, it is not particularly limited thereto.

In the charging dock 20, the wired communication unit 122 is connected to the communication terminal 170, and in the autonomous moving robot 10, the wired communication unit 212 is connected to the communication terminal 240. As described above, in the case of charging the battery 160 of the autonomous moving robot 10, when the charging terminal 180 is connected to the charging terminal 250, the communication terminal 170 is also connected to the communication terminal 240. Accordingly, the wired communication units 122 and 212 are electrically connected to each other through the communication terminals 170 and 240, and thereby they can communicate with each other through wired communication. Although the wired communication system can be wired LAN communication, wired serial communication, or the like, it is not particularly limited thereto.

The sensor group 140 includes the first sensor 116, the second sensor 117, and other sensors. The actuator group 150 includes a motor that drives the carriage 111, a motor that drives the arm 115, and other actuators.

The arithmetic processing unit 130 uses sensor information or the like output from the sensor group 140 to execute various arithmetic processings. However, in this embodiment, a part of the arithmetic processing to be originally executed by the arithmetic processing unit 130 is executed by the arithmetic processing unit 220 of the charging dock 20. More specifically, arithmetic processing related to the drive of the carriage 111 and the arm 115 (hereinafter, it is referred to as the first arithmetic processing) is executed by the arithmetic processing unit 130, and arithmetic processing other than first arithmetic processing (hereinafter, it is referred to as the second arithmetic processing) is executed by the arithmetic processing unit 220 of the charging dock 20.

The first arithmetic processing related to the drive of the carriage 111 executed by the arithmetic processing unit 130 is processing for moving the carriage 111 autonomously. The processing of moving the carriage 111 autonomously includes, for example, generating a moving path based on sensor information (information on a distance to an obstacle) from the first sensor 116, and controlling a motor that drives the carriage 111 so as to autonomously move along the moving path. Further, the first arithmetic processing related to the drive of the arm 115 executed by the arithmetic processing unit 130 is processing for making the grasping unit 113 of the arm 115 grasp an object. The processing of making the grasping unit 113 grasp an object includes, for example, controlling a motor that drives the arm 115 so that the grasping unit 113 grasps an object.

On the other hand, the second arithmetic processing executed by the arithmetic processing unit 220 includes, for example, machine-learning an object grasped by the grasping unit 113 of the arm 115 (for example, machine-learning the object as a remote controller), and estimating an object grasped by the grasping unit 113 of the arm 115 based on a result of machine-learning (a learned model) (for example, estimating that the object is an remote controller). Further, in the case where the autonomous moving robot 10 includes a voice interaction function, processing related to a voice interaction (for example, voice-recognizing an uttered voice of another party, and generating a response sentence for an uttered voice of another party) is included in the second arithmetic processing.

In this embodiment, the arithmetic processing unit 220 of the charging dock 20 executes the second arithmetic processing. Therefore, the communication unit 120 of the autonomous moving robot 10 is configured to be able to transmit arithmetic data (for example, sensor information) used for the second arithmetic processing to the communication unit 210, and is configured to be able to receive a processing result of the second arithmetic processing which has been executed by the arithmetic processing unit 220 from the communication unit 210. Further, the communication unit 210 of the charging dock 20 is configured to be able to receive arithmetic data used for the second arithmetic processing from the communication unit 120, and is configured to be able to transmit a processing result of the second arithmetic processing which has been executed by the arithmetic processing unit 220 to the communication unit 120.

The arithmetic processing unit 130 controls the actuator group 150 based on both the processing results of: the second arithmetic processing which has been executed by the arithmetic processing unit 220 and has been received by the communication unit 120; and the first arithmetic processing which the arithmetic processing unit 130 itself has executed.

Note that between the communication unit 120 of the autonomous moving robot 10 and the communication unit 210 of the charging dock 20, all the communication related to the second arithmetic processing can be performed through wireless communication. However, when all the communication related to the second arithmetic processing is performed through wireless communication, problems, such as a wireless communication band is narrowed, occur.

Therefore, in this embodiment, communication related to a part of the second arithmetic processing is performed through wired communication when the battery 160 of the autonomous moving robot 10 is being charged, and merely the communication related to the remaining second arithmetic processing is performed when the autonomous moving robot 10 (the carriage 111) is moving autonomously through wireless communication.

Specifically, in regard to the above-described part of the second arithmetic processing, when the battery 160 of the autonomous moving robot 10 is being charged, the wired communication units 122 and 212 perform at least one of: communication of arithmetic data used for the second arithmetic processing; and communication of a processing result of the second arithmetic processing, through wired communication. Further, in regard to the remaining second arithmetic processing, when the autonomous moving robot 10 (the carriage 111) is moving autonomously, the wireless communication units 121 and 211 perform at least one of: communication of arithmetic data used for the second arithmetic processing; and communication of a processing result of the second arithmetic processing, through wireless communication.

For example, since it is necessary for processing of machine-learning an object grasped by the grasping unit 113 of the arm 115 among the above-described second arithmetic processings to transmit a large amount of image data for machine learning from the autonomous moving robot 10 to the charging dock 20, a wireless communication band is narrowed when the large amount of image data is continuously transmitted through wireless communication. Further, real-time performance is not required for this processing. Accordingly, this processing for machine learning is the above-described part of the second arithmetic processing, and the communication related to this processing is performed through wired communication when the battery 160 of the autonomous moving robot 10 is being charged.

On the other hand, real-time performance is required for processing of estimating an object grasped by the grasping unit 113 of the arm 115 based on a result of machine learning and processing related to a voice interaction, among the above-described second arithmetic processings. Accordingly, these processings are the above-described remaining second arithmetic processings, and the communication related to these processings is performed through wireless communication when the autonomous moving robot 10 (the carriage 111) is moving autonomously.

Note that another example of the above-described part of second arithmetic processing will be described later.

Arithmetic processing executed by the autonomous moving system 1 according to this embodiment is described below. However, the first arithmetic processing, which is executed inside the autonomous moving robot 10, is the same as that of a conventional autonomous moving system, and thus merely the second arithmetic processing executed in the charging dock 20 is described and the explanation of the first arithmetic processing is omitted.

Figure 3:
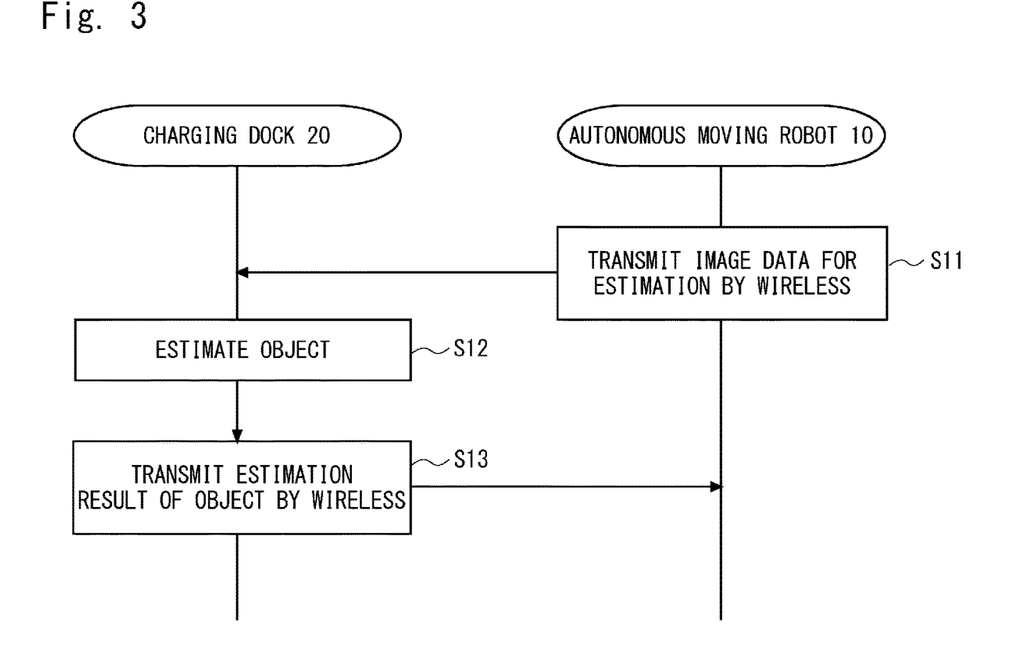
FIG. 3 is a sequence diagram showing an example of second arithmetic processing in which communication is performed when an autonomous moving robot is autonomously moving in the autonomous moving system according to the embodiment.

First, the second arithmetic processing (corresponding to the above-described remaining second arithmetic processing) in which communication is performed when the autonomous moving robot 10 (the carriage 111) is moving autonomously is described with reference to FIG. 3. FIG. 3 is a sequence diagram showing an example of this second arithmetic processing. Note that the second arithmetic processing shown in FIG. 3 is processing for estimating an object grasped by the grasping unit 113 of the arm 115 based on a result of machine learning. Here, the arithmetic processing unit 220 of the charging dock 20 has already performed machine learning which will be described later and has stored a result of the machine learning (a learned model).

As shown in FIG. 3, first, the wireless communication unit 121 of the autonomous moving robot 10 transmits image data photographed by the second sensor 117 for estimation of an object to be estimated which is grasped by the arm 115 to the wireless communication unit 211 of the charging dock 20 through wireless communication (step S11).

Next, the arithmetic processing unit 220 of the charging dock 20 estimates the object to be estimated in the image data for estimation received by the wireless communication unit 211 based on a result of machine learning (step S12).

Then, the wireless communication unit 211 of the charging dock 20 transmits an estimation result of the object to be estimated which has been estimated by the arithmetic processing unit 220 through wireless communication to the wireless communication unit 121 of the autonomous moving robot 10 (step S13).

Figure 4:
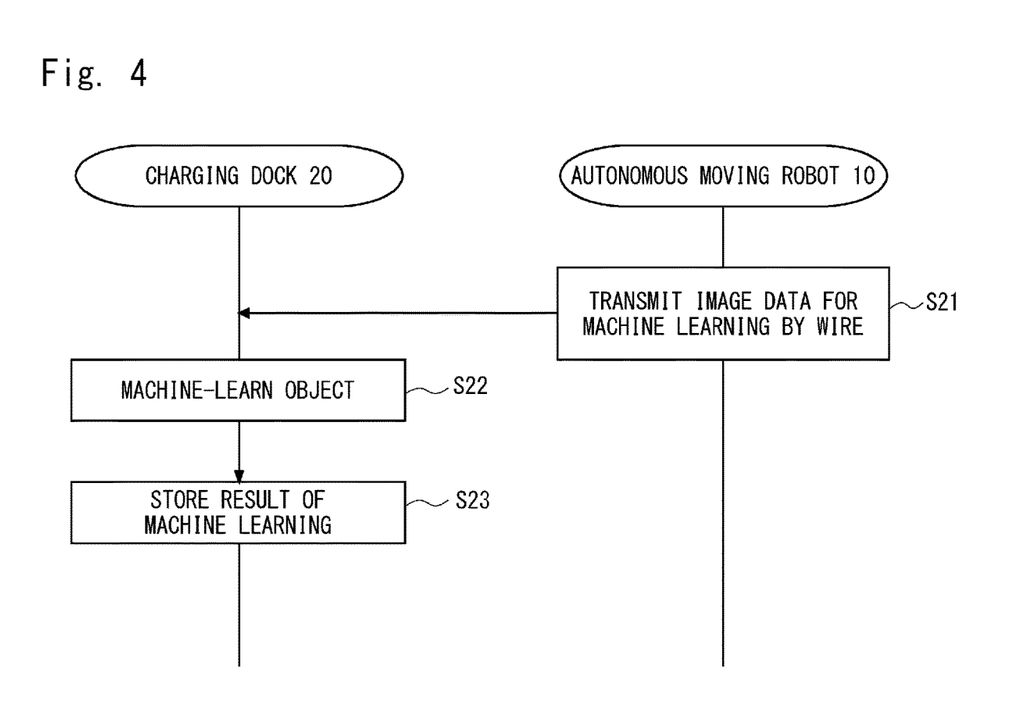
FIG. 4 is a sequence diagram showing an example of the second arithmetic processing in which communication is performed when a battery of an autonomous moving robot is being charged in the autonomous moving system according to the embodiment.

Next, the second arithmetic processing (corresponding to the above-described part of the second arithmetic processing) in which communication is performed when the battery 160 of the autonomous moving robot 10 is being charged is described with reference to FIG. 4. FIG. 4 is a sequence diagram showing an example of this second arithmetic processing. Note that the second arithmetic processing shown in FIG. 4 is processing for machine-learning an object grasped by the grasping unit 113 of the arm 115.

As shown in FIG. 4, first, the wireless communication unit 122 of the autonomous moving robot 10 transmits image data for machine learning of an object to be learned which is grasped by the arm 115, which the second sensor 117 has photographed, to the wired communication unit 212 of the charging dock 20 through wired communication (step S21). At this time, as the image data for machine learning, a large amount of image data in which the object to be learned is photographed at various angles is transmitted.

Next, the arithmetic processing unit 220 of the charging dock 20 machine-learns the object to be learned in the image data for machine learning which has been received by the wired communication unit 212 (step S22).

Then, the arithmetic processing unit 220 of the charging dock 20 stores a result of machine learning (step S23).

An example of the second arithmetic processing (corresponding to the above-described part of the second arithmetic processing) in which communication is performed when the battery 160 of the autonomous moving robot 10 is being charged among the second arithmetic processings executed by the arithmetic processing unit 220 of the charging dock 20 is described below.

(A) First Example

The second arithmetic processing according to this example is processing for machine-learning an object grasped by the grasping unit 113 of the arm 115 as described above.

In this example, when the battery 160 of the autonomous moving robot 10 is being charged, the wired communication unit 212 of the charging dock 20 receives image data for machine learning in which an object to be learned is photographed as arithmetic data for the second arithmetic processing from the wired communication unit 122 of the autonomous moving robot 10 through wired communication. The arithmetic processing unit 220 of the charging dock 20 machine-learns the object to be learned in the image data for machine learning which has been received by the wired communication unit 212.

When the arithmetic processing unit 220 machine-learns an object to be learned, a large amount of image data for machine learning in which the object is photographed at various angles is necessary. When the large amount of the image data for machine learning is continuously transmitted through wireless communication, a wireless communication band is narrowed.

In this example, image data for machine learning is transmitted through wired communication, and thereby the wireless communication band can be prevented from being narrowed by the transmission of the image data for machine learning.

(B) Second Example

The second arithmetic processing according to this example is processing for downloading and updating firmware of the autonomous moving robot 10.

In this example, the arithmetic processing unit 220 of the charging dock 20 uses the wireless communication unit 211 to download firmware to be updated in the autonomous moving robot 10 through wireless communication from a predetermined server. Note that this downloading may be performed when the battery 160 of the autonomous moving robot 10 is being charged or may be performed in advance. When the battery 160 of the autonomous moving robot 10 is being charged, the wired communication unit 212 of the charging dock 20 sends firmware as a processing result of the second arithmetic processing and an instruction for updating the firmware to the wired communication unit 122 of the autonomous moving robot 10 through wired communication.

For example, in the case where a plurality of autonomous moving robots 10 are operated by one charging dock 20, a wireless communication band is narrowed when each one of the plurality of the autonomous moving robots 10 respectively downloads firmware through wireless communication from a predetermined server. In this example, since merely one charging dock 20 downloads firmware through wireless communication, the wireless communication band can be prevented from being narrowed by the download of the firmware.

(C) Third Example

The second arithmetic processing according to this example is processing for uploading diagnostic information on the autonomous moving robot 10.

In this example, when the battery 160 of the autonomous moving robot 10 is being charged, the autonomous moving robot 10 executes a diagnostic tool. The wired communication unit 212 of the charging dock 20 receives diagnostic information indicating failed parts, the number of movements, and the like acquired by the execution of the diagnostic tool as arithmetic data for the second arithmetic processing from the wired communication unit 122 of the autonomous moving robot 10 through wired communication. The arithmetic processing unit 220 of the charging dock 20 uses the wireless communication unit 211 to upload the diagnostic information on the autonomous moving robot 10 to a predetermined server through wireless communication.

For example, in the case where a plurality of autonomous moving robots 10 are operated by one charging dock 20, a wireless communication band is narrowed when each one of the plurality of the autonomous moving robots 10 respectively uploads the diagnostic information to a predetermined server through wireless communication.

In this example, when the charging dock 20 collectively uploads the diagnostic information of the plurality of the autonomous moving robot 10 through wireless communication, the wireless communication band can be prevented from being narrowed by the upload of the diagnostic information.

(D) Fourth Example

The second arithmetic processing according to this example is processing for sharing map data and image data in a plurality of autonomous moving robots 10.

In this example, the arithmetic processing unit 220 of the charging dock 20 stores map data (for example, map data of the moving environment of the autonomous moving robot 10) and image data (image data which have been used for machine learning), which are shared by a plurality of autonomous moving robots 10. When the battery 160 of the autonomous moving robot 10 is being charged, the wired communication unit 212 of the charging dock 20 sends the map data and the image data to be shared as a processing result of the second arithmetic processing to the wired communication unit 122 of the autonomous moving robot 10 through wired communication.

In this example, when a plurality of the autonomous moving robots 10 are operated by one charging dock 20 or when the autonomous robot 10 is replaced, the autonomous moving robot 10 can share the map data and the image data merely by being connected to the charging dock 20 in order to charge the battery 160, and thereby the data can be transferred to the autonomous moving robot 10.

Further, in this example, by transmitting the map data and the image data through wired communication, a wireless communication band can be prevented from being narrowed by the transmission of the map data and the image data.

According to this embodiment as described above, the autonomous moving robot 10 executes the first arithmetic processing related to the drive of the carriage 111 and the arm 115, and the charging dock 20 executes the second arithmetic processing other than the first arithmetic processing. Further, the charging dock 20 is configured to be able to receive arithmetic data used for the second arithmetic processing from the autonomous moving robot 10, and is configured to be able to transmit a processing result of the second arithmetic processing which the charging dock 20 itself has executed to the autonomous moving robot 10.

According to this embodiment as described above, a part of the arithmetic processing of the autonomous moving robot 10 (the second arithmetic processing) is executed in the charging dock 20. This reduces a processing load of the arithmetic processing unit 130 and thereby prevents the battery 160 from being consumed. Accordingly, the autonomous moving robot 10 can improve an operation efficiency. Further, the autonomous moving robot 10 executes this first arithmetic processing related to the drive of the carriage 111, and communication related to this first arithmetic processing is not performed between the autonomous moving robot 10 and the charging dock 20. This prevents a real-time moving operation of the carriage 111 from being awkward due to a communication amount and a communication speed between the autonomous moving robot 10 and the charging dock 20. Accordingly, a problem in which a moving operation of an autonomous moving robot 10 becomes awkward can be prevented from occurring while an operation efficiency of the autonomous moving robot 10 is prevented from being reduced.

Further, according to this embodiment, since the autonomous moving robot 10 also executes the first arithmetic processing related to the drive of the arm 115, a real-time grasping operation of the arm 115 is prevented from being awkward.

Further, according to this embodiment, in regard to a part of the second arithmetic processing, the charging dock 20 receives arithmetic data and transmits a processing result, through wired communication, when the battery 160 of the autonomous moving robot 10 is being charged, and merely in regard to the remaining second arithmetic processing, the charging dock 20 receives arithmetic data and transmits a processing result, through wireless communication, when the carriage 111 of the autonomous moving robot 10 is moving autonomously.

According to this embodiment as described above, communication according to the part of the second arithmetic processing is performed through wired communication when the charging dock 20 is charging the battery 160. Thus, it is possible to, for example, prevent a wireless communication band from being narrowed by the communication related to the second arithmetic processing, which is an advantage.

Note that the present disclosure is not limited to the above-described embodiments, and can be appropriately changed without departing from the spirit of the present disclosure.

For example, in the above-described embodiments, although the autonomous moving body includes the carriage and the arm as a driven body, the present disclosure is not limited thereto. The autonomous moving body may include at least the carriage, and there is no limitation on whether or not the arm is included. Further, an autonomous moving body may include a driven body other than the arm in addition to the carriage.

Further, in the above-described embodiments, a configuration in which in the case of charging a battery of the autonomous moving body, when charging terminals are connected to each other, communication terminals are also connected to each other, and thus wired communication can be performed has been described, but the present disclosure is not limited to this configuration. The communication terminals may be, for example, manually connected to each other by a user through a cable or the like.

Further, in the above-described embodiments, the autonomous moving body and the charging dock according to the present disclosure have been described as a hardware configuration, but the present disclose is not limited thereto. In the present disclosure, any processing of the autonomous moving body and the charging dock can be achieved by a processor, such as a CPU (Central Processing Unit), loading and executing a computer program stored in a memory.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An autonomous moving system, comprising an autonomous moving body and a charging dock, the autonomous moving body comprising: a driven body comprising at least a carriage capable of moving autonomously; and a battery, the charging dock comprising a charger configured to charge the battery, the autonomous moving body further comprising:
   a first communication unit configured to be able to communicate with the charging dock; and
   a first arithmetic processing unit configured to execute first arithmetic processing related to the drive of the driven body among arithmetic processings of the autonomous moving body,
   the charging dock further comprising:
   a second communication unit configured to be able to communicate with the autonomous moving body; and
   a second arithmetic processing unit configured to execute second arithmetic processing other than the first arithmetic processing among the arithmetic processings of the autonomous moving body, wherein
   the second communication unit is configured to be able to receive arithmetic data used for the second arithmetic processing from the first communication unit, and is configured to be able to transmit a processing result of the second arithmetic processing which has been executed by the second arithmetic processing unit to the first communication unit,
   the first communication unit and the second communication unit include a wireless communication function and a wired communication function,
   in regard to a part of the second arithmetic processing, when the charger is charging the battery, the second communication unit performs at least one of: receiving the arithmetic data used for the part of the second arithmetic processing through wired communication; and transmitting a processing result of the part of the second arithmetic processing, through wired communication,
   in regard to the remaining second arithmetic processing, when the carriage is moving autonomously, the second communication unit performs at least one of: receiving the arithmetic data used for the remaining second arithmetic processing; and transmitting a processing result of the remaining second arithmetic processing, through wireless communication,
   the driven body comprises an arm provided in the carriage,
   the first arithmetic processing is processing for making the carriage move autonomously and processing for making the arm grasp an object,
   the part of the second arithmetic processing is processing for machine-learning the object grasped by the arm, and
   the remaining second arithmetic processing is processing for estimating the object grasped by the arm based on a result of the machine learning.

2. The autonomous moving system according to claim 1, wherein
   in the case where the part of the second arithmetic processing is processing for machine-learning an object,
   the second communication unit receives image data for machine learning in which the object grasped by the arm is photographed from the first communication unit through wired communication, and the second arithmetic processing unit machine-learns the object in the image data for machine learning which has been received by the second communication unit, and
   in the case where the remaining second arithmetic processing is processing for estimating the object grasped by the arm based on a result of the machine learning,
   the second communication unit receives image data for estimation in which the object grasped by the arm is photographed from the first communication unit through wireless communication, the second arithmetic processing unit estimates the object in the image data for estimation which has been received by the second communication unit based on a result of machine learning, and the second communication unit transmits an estimation result of the object which has been estimated by the second arithmetic processing unit to the first communication unit through wireless communication.

3. An autonomous moving body comprising:
   a driven body comprising at least a carriage capable of moving autonomously; and
   a battery capable of charging at a charging dock,
   the autonomous moving body further comprising:
   a communication unit capable of communicating with the charging dock; and
   an arithmetic processing unit configured to execute first arithmetic processing related to the drive of the driven body among arithmetic processings of the autonomous moving body, wherein
   the communication unit is configured to be able to transmit arithmetic data used for second arithmetic processing other than the first arithmetic processing among the arithmetic processings of the autonomous moving body to the charging dock, and is configured to be able to receive a processing result of the second arithmetic processing which has been executed by the charging dock from the charging dock,
   the communication unit includes a wireless communication function and a wired communication function,
   in regard to a part of the second arithmetic processing, when the charging dock is charging the battery, the communication unit performs at least one of: transmitting the arithmetic data used for the part of the second arithmetic processing through wired communication; and receiving a processing result of the part of the second arithmetic processing, through wired communication,
   in regard to the remaining second arithmetic processing, when the carriage is moving autonomously, the communication unit performs at least one of: transmitting the arithmetic data used for the remaining second arithmetic processing; and receiving a processing result of the remaining second arithmetic processing, through wireless communication, the driven body comprises an arm provided in the carriage, the first arithmetic processing is processing for making the carriage move autonomously and processing for making the arm grasp an object, the part of the second arithmetic processing is processing for machine-learning the object grasped by the arm, and the remaining second arithmetic processing is processing for estimating the object grasped by the arm based on a result of the machine learning.

4. A charging dock comprising a charger configured to charge a battery of an autonomous moving body, the autonomous moving body comprising: a driven body comprising at least a carriage capable of moving autonomously; and the battery, the charging dock further comprising:

a communication unit capable of communicating with the autonomous moving body; and an arithmetic processing unit configured to execute second arithmetic processing other than first arithmetic processing related to the drive of the driven body among arithmetic processings of the autonomous moving body, wherein the communication unit is configured to be able to receive arithmetic data used for the second arithmetic processing from the autonomous moving body, and is configured to be able to transmit a processing result of the second arithmetic processing which has been executed by the arithmetic processing unit to the autonomous moving body, the communication unit includes a wireless communication function and a wired communication function, in regard to a part of the second arithmetic processing, when the charger is charging the battery, the communication unit performs at least one of: receiving the arithmetic data used for the part of the second arithmetic processing through wired communication; and transmitting a processing result of the part of the second arithmetic processing, through wired communication, in regard to the remaining second arithmetic processing, when the carriage is moving autonomously, the communication unit performs at least one of: receiving the arithmetic data used for the remaining second arithmetic processing; and transmitting a processing result of the remaining second arithmetic processing, through wireless communication, the driven body comprises an arm provided in the carriage, the first arithmetic processing is processing for making the carriage move autonomously and processing for making the arm grasp an object, the part of the second arithmetic processing is processing for machine-learning the object grasped by the arm, and the remaining second arithmetic processing is processing for estimating the object grasped by the arm based on a result of the machine learning.

5. A method for controlling an autonomous moving body, the autonomous moving body comprising: a driven body comprising at least a carriage capable of moving autonomously; and a battery capable of being charged at a charging dock, the method comprising:

configuring the autonomous moving body so as to be capable of executing first arithmetic processing related to the drive of the driven body among arithmetic processings of the autonomous moving body;

configuring the autonomous moving body so as to be capable of transmitting, via a communication unit, arithmetic data used for second arithmetic processing other than the first arithmetic processing among the arithmetic processings of the autonomous moving body to the charging dock; and configuring the autonomous moving body so as to be capable of receiving a processing result of the second arithmetic processing which has been executed by the charging dock from the charging dock, wherein the communication unit includes a wireless communication function and a wired communication function, in regard to a part of the second arithmetic processing, when the charging dock is charging the battery, the communication unit performs at least one of: transmitting the arithmetic data used for the part of the second arithmetic processing through wired communication; and receiving a processing result of the part of the second arithmetic processing, through wired communication, in regard to the remaining second arithmetic processing, when the carriage is moving autonomously, the communication unit performs at least one of: transmitting the arithmetic data used for the remaining second arithmetic processing; and receiving a processing result of the remaining second arithmetic processing, through wireless communication, the driven body comprises an arm provided in the carriage, the first arithmetic processing is processing for making the carriage move autonomously and processing for making the arm grasp an object, the part of the second arithmetic processing is processing for machine-learning the object grasped by the arm, and the remaining second arithmetic processing is processing for estimating the object grasped by the arm based on a result of the machine learning.

6. A method for controlling a charging dock, the charging dock comprising a charger configured to charge a battery of an autonomous moving body, the autonomous moving body comprising: a driven body comprising at least a carriage capable of moving autonomously; and the battery, the method comprising:

configuring the charging dock so as to be capable of receiving, via a communication unit, arithmetic data used for second arithmetic processing other than first arithmetic processing related to the drive of the driven body among arithmetic processings of the autonomous moving body from the autonomous moving body;

configuring the charging dock so as to be capable of executing the second arithmetic processing; and configuring the charging dock so as to be capable of transmitting a processing result of the second arithmetic processing to the autonomous moving body, wherein the communication unit includes a wireless communication function and a wired communication function, in regard to a part of the second arithmetic processing, when the charger is charging the battery, the communication unit performs at least one of: receiving the arithmetic data used for the part of the second arithmetic processing through wired communication; and transmitting a processing result of the part of the second arithmetic processing, through wired communication, in regard to the remaining second arithmetic processing, when the carriage is moving autonomously, the communication unit performs at least one of: receiving the arithmetic data used for the remaining second arithmetic processing; and transmitting a processing result of the remaining second arithmetic processing, through wireless communication, the driven body comprises an arm provided in the carriage, the first arithmetic processing is processing for making the carriage move autonomously and processing for making the arm grasp an object, the part of the second arithmetic processing is processing for machine-learning the object grasped by the arm, and the remaining second arithmetic processing is processing for estimating the object grasped by the arm based on a result of the machine learning.

7. A non-transitory computer readable medium storing a program causing an autonomous moving body to function as a communication means capable of communicating with a charging dock; and an arithmetic processing means for executing first arithmetic processing related to the drive of a driven body among arithmetic processings of the autonomous moving body, the autonomous moving body comprising: the driven body comprising at least a carriage capable of moving autonomously; and a battery capable of charging at the charging dock, wherein the communication means is configured to be able to transmit arithmetic data used for second arithmetic processing other than the first arithmetic processing among the arithmetic processings of the autonomous moving body, and is configured to be able to receive a processing result of the second arithmetic processing which has been executed by the charging dock from the charging dock, the communication means includes a wireless communication function and a wired communication function, in regard to a part of the second arithmetic processing, when the charging dock is charging the battery, the communication means performs at least one of: transmitting the arithmetic data used for the part of the second arithmetic processing through wired communication; and receiving a processing result of the part of the second arithmetic processing, through wired communication, in regard to the remaining second arithmetic processing, when the carriage is moving autonomously, the communication means performs at least one of: transmitting the arithmetic data used for the remaining second arithmetic processing; and receiving a processing result of the remaining second arithmetic processing, through wireless communication, the driven body comprises an arm provided in the carriage, the first arithmetic processing is processing for making the carriage move autonomously and processing for making the arm grasp an object, the part of the second arithmetic processing is processing for machine-learning the object grasped by the arm, and the remaining second arithmetic processing is processing for estimating the object grasped by the arm based on a result of the machine learning.

8. A non-transitory computer readable medium storing a program causing a charging dock to function as a communication means capable of communicating with an autonomous moving body; and an arithmetic processing means for executing second arithmetic processing other than first arithmetic processing related to the drive of a driven body among arithmetic processings of the autonomous moving body, the charging dock comprising a charger configured to charge a battery of the autonomous moving body, the autonomous moving body comprising: the driven body comprising at least a carriage capable of moving autonomously; and the battery, wherein the communication means is configured to be able to receive arithmetic data used for the second arithmetic processing from the autonomous moving body, and is configured to be able to transmit a processing result of the second arithmetic processing which has been executed by the arithmetic processing means to the autonomous moving body, the communication means includes a wireless communication function and a wired communication function, in regard to a part of the second arithmetic processing, when the charger is charging the battery, the communication means performs at least one of: receiving the arithmetic data used for the part of the second arithmetic processing through wired communication; and transmitting a processing result of the part of the second arithmetic processing, through wired communication, in regard to the remaining second arithmetic processing, when the carriage is moving autonomously, the communication means performs at least one of: receiving the arithmetic data used for the remaining second arithmetic processing; and transmitting a processing result of the remaining second arithmetic processing, through wireless communication, the driven body comprises an arm provided in the carriage, the first arithmetic processing is processing for making the carriage move autonomously and processing for making the arm grasp an object, the part of the second arithmetic processing is processing for machine-learning the object grasped by the arm, and the remaining second arithmetic processing is processing for estimating the object grasped by the arm based on a result of the machine learning.

* * * * *